United States Patent
Tauchmann et al.

(10) Patent No.: US 9,415,477 B2
(45) Date of Patent: Aug. 16, 2016

(54) METHOD FOR OPERATING A MACHINE TOOL, PROJECTION DEVICE FOR A MACHINE TOOL AND MACHINE TOOL WITH SUCH A PROJECTION DEVICE

(71) Applicant: Siemens Aktiengesellschaft, München (DE)

(72) Inventors: Sven Tauchmann, Chemnitz (DE); Andre Vieweg, Chemnitz (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 556 days.

(21) Appl. No.: 13/827,914

(22) Filed: Mar. 14, 2013

(65) Prior Publication Data

US 2013/0240227 A1    Sep. 19, 2013

(30) Foreign Application Priority Data

Mar. 15, 2012    (EP) .................................. 12159589

(51) Int. Cl.
*B23Q 17/24*    (2006.01)
*B23Q 17/00*    (2006.01)

(52) U.S. Cl.
CPC ............ *B23Q 17/2452* (2013.01); *B23Q 17/00* (2013.01); *B23Q 17/24* (2013.01)

(58) Field of Classification Search
CPC ................................ B23Q 17/00; B23B 47/00
USPC ................................... 173/1, 2, 4, 20; 408/236
See application file for complete search history.

(56) References Cited

U.S. PATENT DOCUMENTS

| 2003/0184768 A1* | 10/2003 | Fujishima | G01B 11/272 356/614 |
| 2006/0016957 A1* | 1/2006 | Hofmann | B28D 1/043 250/201.1 |
| 2006/0104734 A1* | 5/2006 | Mathis | B23B 39/04 408/236 |

FOREIGN PATENT DOCUMENTS

| CN | 1386213 A | 12/2002 |
| CN | 101069125 A | 11/2007 |
| CN | 101322071 A | 12/2008 |
| CN | 100462198 C | 2/2009 |
| CN | 101790433 A | 7/2010 |
| CN | 101815980 A | 8/2010 |
| EP | 1671745 A1 | 6/2006 |
| JP | 7328894 A | 12/1995 |

OTHER PUBLICATIONS

"True 3D-Display" in: http://burton-jp.com/en/product.htm (Feb. 2012); Others; 2012.
3D-Projektor in: http://golem.de/0603/43672.html Japanisches "National Institute of Advanced Industrial Science and Technology" (AIST), Keio-Universität und Fa. Burton (Feb. 2012); Others; 2012.

* cited by examiner

*Primary Examiner* — Nathaniel Chukwurah
(74) *Attorney, Agent, or Firm* — Henry M. Feiereisen LLC

(57) ABSTRACT

A method for operating a machine tool is disclosed wherein during operation of the machine tool at least one state of the machine tool is projected into a working area of the machine tool with a 3D projector at a predefined point in space in the working area. A projection device performing the method and a machine tool with such a projection device is also disclosed.

4 Claims, 5 Drawing Sheets

METHOD FOR OPERATING A MACHINE TOOL, PROJECTION DEVICE FOR A MACHINE TOOL AND MACHINE TOOL WITH SUCH A PROJECTION DEVICE

CROSS-REFERENCES TO RELATED APPLICATIONS

This application claims the priority of European Patent Application, Serial No. EP 12159589, filed Mar. 15, 2012, pursuant to 35 U.S.C. 119(a)-(d), the content of which is incorporated herein by reference in its entirety as if fully set forth herein.

BACKGROUND OF THE INVENTION

The present invention relates to a method for operating a machine tool. The invention also relates to a projection device that is or can be used with the method and to a machine tool with such a projection device.

The following discussion of related art is provided to assist the reader in understanding the advantages of the invention, and is not to be construed as an admission that this related art is prior art to this invention.

The term machine tool here and below encompasses machine tools, robots and other numerically controlled machines with multiple degrees of freedom. Machine tools, in other words for example machine tools and robots, are known per se. Likewise known are methods for operating such machine tools. When operating a milling machine, as an example of a machine tool, for example at least one trajectory is predefined for a tool, namely a milling head or similar, and the milling machine uses suitable control, known per se, of the degrees of freedom, frequently also called axes, to cause the milling head to follow the predefined trajectory and therefore a contour corresponding to the trajectory is created in a respective workpiece to be machined. Alternatively to moving the respective tool, consideration can also be given to moving the workpiece. Moving the workpiece in this way is also effected with corresponding control of the respective axes of the machine tool. Generally it is therefore found that for operating, for example, milling machines or similar as an example of a machine tool, in each case at least one contour which the respective workpiece is to keep to is predefined, whereby the contour is created as a result of a relative movement of tool and workpiece, in that either the tool or the workpiece is moved along a trajectory necessary to keep to the contour.

Functionally identical relationships apply for soldering and/or automatic placement machines, in which for operation a workpiece is not machined with tools in the sense of abrasive shaping, but in which a placement head carries out placement and/or soldering operations. Robots, as another embodiment of machine tools relevant in this case, are suitable, similarly to milling machines, for the abrasive machining of workpieces, as well as for handling and loading operations, for welding operations (welding robots in the automotive industry), for assembling circuit boards, for precise repetition of machining steps, for instance in medical engineering, and so on.

However, one aspect which is as yet not entirely optimal when operating such or similar machine tools is that programming them is complex and requires a precise knowledge in each case of coordinate systems used and of any changes in their orientation during the operation of a machine tool.

Accordingly programming or commissioning, etc. a machine tool calls for extraordinarily good ability of spatial imagination from the respective expert and the ability to translate this into a description of movement operations in the respective coordinate system provided for programming the machine tool.

It would therefore be desirable and advantageous to obviate prior art shortcomings and to provide an improved method for operating a machine tool which assists a programmer or operator of such a machine tool when programming, commissioning and/or using it.

SUMMARY OF THE INVENTION

According to one aspect of the present invention, a method for operating a machine tool employs a projector to project one or more states of the machine tool into a working area of the machine tool and to display them in the working area so that they are visually discernable for the operator.

"Operating the machine tool" here means programming, commissioning or maintaining it, or normal use of the machine tool, in other words for example during production.

The method further provides that individual or multiple states of the machine tool are projected into the working area of the machine tool at a predefined or predefinable point in space in the working area with a 3D projector. Such a 3D projection has the advantage that in comparison with the machine states that can be displayed with a 2D projection, such as for example actual axis values, in other words instantaneous positions of the machine tool and of individual or all degrees of freedom encompassed thereby, additional information can be conveyed which can be optimally displayed in three-dimensional form.

With the method of the invention, current machine states, in other words for example position information, may displayed directly in the working area of the machine tool using a suitable projection, so that the respective operator can orient himself to the machine tool and avoid or discover errors when programming, commissioning, maintaining, etc. the machine tool. The display in the working area of the machine tool is particularly favorable here because on the one hand the displayed states of the machine tool and on the other hand also a movement of the machine tool can be simultaneously observed. This is agreeable for the operator because he need not constantly be looking in different directions and additionally symptoms of fatigue caused by constantly refocusing the eyes are avoided. Furthermore the simultaneous observation of on the one hand the displayed states of the machine tool as well as on the other hand the continuous movement of the machine tool permits rapid responses to any hazardous situations, which is not possible, or only with a delay, if such state information is displayed to the operator on a computer display or similar.

It should be noted that a projection of state information onto a projection surface located in a user's normal line of sight is presently known in the case of private cars, in which states such as for example a current speed, any speed limit or instructions from a navigation system are displayed on the front windshield of the vehicle using a projector. The driver has the impression that the information is displayed on the road in front of him and can concentrate his attention on the traffic situation and the road ahead and does not have to divert his gaze in order to read such information from display instruments normally located on the dashboard.

According to an advantageous feature of the present invention, the projection of individual or multiple states of the machine tool into a working area of the machine tool may be additionally effected with a 2D projector onto a surface located in the working area. The 2D projector can in principle be any device commonly used in this respect, in other words for example a video projector. Special embodiments of such video projectors are called pico-projectors or LED projectors. The surface for the projection located in the working area can be a machine wall or similar, such as a work cell border, or also a pane installed in the working area. The information displayed by the projection can also comprise parts of the so-called human-machine interface (HMI), in other words displays such as are normally effected on a so-called operator panel (OP) for programming and/or operating the machine tool.

According to another advantageous feature of the present invention, information referred to above that can be additionally displayed with 3D projection may be a display of a coordinate system of the machine tool, wherein the projection includes a correctly oriented display of individual or all coordinate axes of such a coordinate system, in other words with a respective orientation of the coordinate axes in space, corresponding to the actual orientation of the respective coordinate system. The coordinate systems that can be displayed in this respect include a workpiece coordinate system (WKS), a machine coordinate system (MKS), a base coordinate system (BKS) and/or a virtual coordinate system (KOS). The user is able to select the coordinate system displayed in each case. A coordinate system, for example the workpiece coordinate system, can here be preselected as a default setting, so that it is always displayed unless a projection of another coordinate systems has been explicitly selected.

The three-dimensional display of the respective coordinate system (MKS, WKS, etc.) in particular helps the machine operator for example to preset a tool movement and an orientation of the workpiece in space. Without appropriate practice this is extremely difficult, especially for movements of five-axis machine tools or a robot.

In the case of the three-dimensional projection of individual or multiple states of the machine tool the operator in other words has in his field of view both the workpiece and the machine state or every machine state of interest to him, in particular the coordinate system of interest to him in each case. Furthermore the operator can, likewise in connection with the 3D projection, keep current machine states or parts of the respective NC program in his sight, without constantly having to look at an operator panel (OP) or the like, and thus being distracted. This facilitates transparency and simplifies the operation of the machine tool.

According to another advantageous feature of the present invention, for operating a machine tool, in which one or more states of the machine tool are projected into a working area of the machine tool with a 3D projector, the 3D projector may be a 3D laser projector which for successively emitted laser beams may be configured to vary a focal point of the laser beam, in order to trigger an effect visible to the human eye, in particular a plasma discharge, at a point determined in this way.

3D projections without additional aids such as for example slides, screens, spectacles or similar are currently still at a preliminary stage.

According to another advantageous feature of the present invention, the projection, in particular a projection of a coordinate system, may be performed at a workpiece zero point as a predefined point in space. The machine operator can then directly observe a coordinate system for example displayed there when viewing the workpiece.

According to another aspect of the invention, a projection device includes a projector, in other words a 3D projector as described above or such a 3D projector and a 2D projector, as well as a processing unit and a memory. The processing unit is a microprocessor or similar. A computer program with which a method as described here and below can be executed and which can be executed with the processing unit is loaded into the memory. The projection device can here be part of a control device of a machine tool or can be implemented independently of such a control device. In an embodiment independent of a control device of the machine tool, the control device and the projection device are or can be communicatively linked in suitable fashion, so that the projection device contains at least information about the states of the machine tool to be displayed in each case. The communicative link can be any normal wired or wireless signal transfer and/or data transfer. The data to be transferred in each case can be either directly the states of the machine tool to be displayed or any suitable information, on the basis of which the processing unit of the projection device can determine or calculate this itself.

Some aspects of the invention may be implemented in software. According to another aspect of the invention, a computer program with program code instructions is provided that can be executed by a computer, namely the projection device, and on the other hand a storage medium with a computer program of this type as well as ultimately also a projection device, into whose memory such a computer program is or can be loaded as means for implementing the method and its embodiments.

The invention overall also relates to a machine tool in accordance with the definition set out in the introduction with means for executing a method as described here and below, in particular a projection device as likewise described here and below.

With the invention and its embodiments, in particular by projecting one or more machine states into the respective working area of the machine tool to assist the operator, a considerable amount of information can be displayed. In individual cases, this can for example extend to a display of sections of an NC program which are relevant in the case of a respectively occurring movement of the machine tool.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
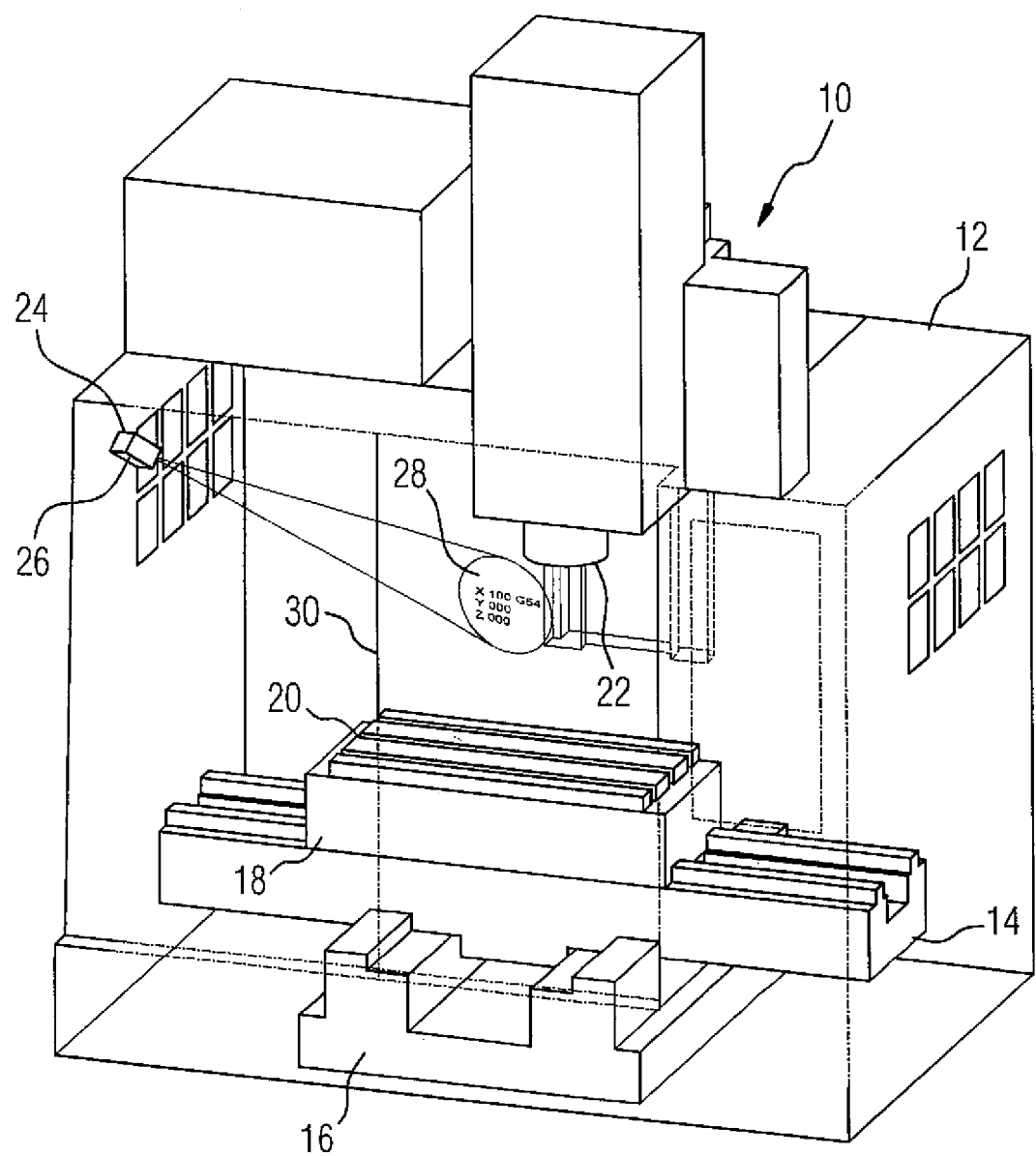
FIG. 1 an exemplary machine tool in form of a milling machine, in whose working area individual position information of the axes encompassed by the machine tool are displayed as operating states of the machine tool in the form of a projection, using a projector, FIG. 2 a segment of the illustration in FIG. 1 with an enlargement of the machine states displayed as a projection, FIG. 3 a segment of an illustration of a machine tool with at least two rotational degrees of freedom and a coordinate system displayed in its working area with the correct orientation as a machine state, FIG. 4 an illustration similar to that in FIG. 3, wherein the coordinate system displayed with the correction orientation as a machine state is projected onto a workpiece zero point, and FIG. 5 a schematic diagram of a projection device for displaying individual or multiple states of a machine tool with a 2D or 3D projector and its basic attachment to a control device for controlling and/or monitoring the respective machine tool.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown as an of an exemplary machine tool 10 a milling machine surrounded by a housing 12 or a protection zone. The milling machine displayed includes two translatory degrees of freedom, implemented as axes 14, 16 movable in the x direction and y direction. The individual axes 14, 16 are shown only diagrammatically simplified in the form of profile elements, in which in each case, for example with a main spindle or similar, a movement in the x direction and y direction is possible.

Figure 3:
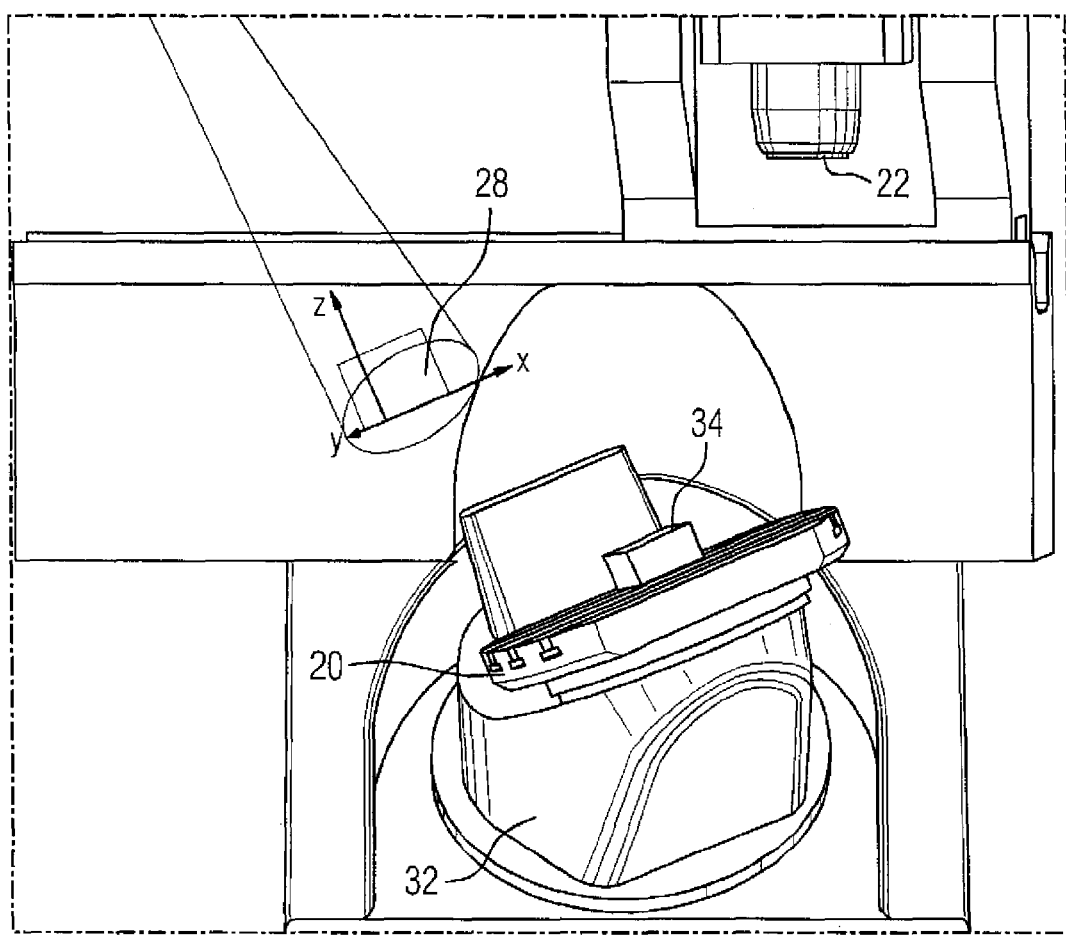

Located on the profile for the x axis 14 is a workpiece slide 18 and on this in turn a milling table 20, in other words a mounting plate or similar, for attaching workpieces to be machined using the milling machine (not shown, see FIG. 3). To machine such a workpiece the milling machine has an axis oriented vertically, in other words in the z direction, with a milling spindle 22 or similar and a tool support. A milling head or similar can be connected to the tool support in a manner known per se and the machining of the respective workpiece can be effected using such a milling head (not shown).

With the milling table 20 that can move in the x direction and y direction and the milling spindle 22 that can move in the z direction the milling machine illustrated has three translatory degrees of freedom. The kinematics of the milling machine could also be embodied such that the milling table 20 is stationary and with a corresponding mechanical system the milling spindle 22 can also move in the x direction and y direction in addition to the translatory mobility in the z direction. The specific kinematics of the milling machine or of any other machine tool 10, for which the milling machine here stands just as an example, are otherwise of no special importance for the invention.

The machine tool 10 includes a projector 24, here a 2D projector 26, or the machine tool 10 is associated with such a projector 24, 26, for example during commissioning. The projector 24, 26 is used to project one or more states of the machine tool 10 into a working area of the machine tool 10. This is shown in FIG. 1 as a projection 28. The projection 28 is effected onto a pane 30 as one possibility for a surface that can be used for the projection 28 and that is located in the working area of the machine tool 10. Instead of the pane 30 any other suitable projection surface can also be used in principle, in other words for example in the case of a machine tool 10 located in a housing 12 a surface of such a housing 12 or any other surface which for example is in any case required to delimit a protection zone around the machine tool 10.

An instantaneous position of the three degrees of freedom of the milling machine illustrated as an example of a machine tool 10 is shown as states of the machine tool 10 projected with the projector 24, 26 into the working area of the machine tool 10. The projected machine states are thereby individually "X 100 G54"; "Y 000"; "Z 000". This is shown enlarged in FIG. 2 as a segment of the illustration in FIG. 1. The projection 28 is in this case effected at a predefined or predefinable point in space in the working area of the machine tool 10, wherein the respective point in space for example corresponds to a position on the projection surface, namely for example a pane 30 or similar.

The predefined or predefinable point in space as a location of the projection 28 can be influenced by a suitable orientation of the projector 24, 26 or an optical system incorporated into the projector 24, 26 for this purpose. The orientation of the projector 24, 26 or an optical system of the projector 24, 26 can be influenced manually or automatically, for example as a function of a movement of the machine tool 10 or of the respective workpiece. For automatic influence of this type the projector 24, 26 or a projection device (FIG. 5) including the projector 24, 26 includes one or more suitable actuators which can be triggered by control signals which encode the intended influence, in other words for example swiveling the projector 24, 26.

Figure 2:
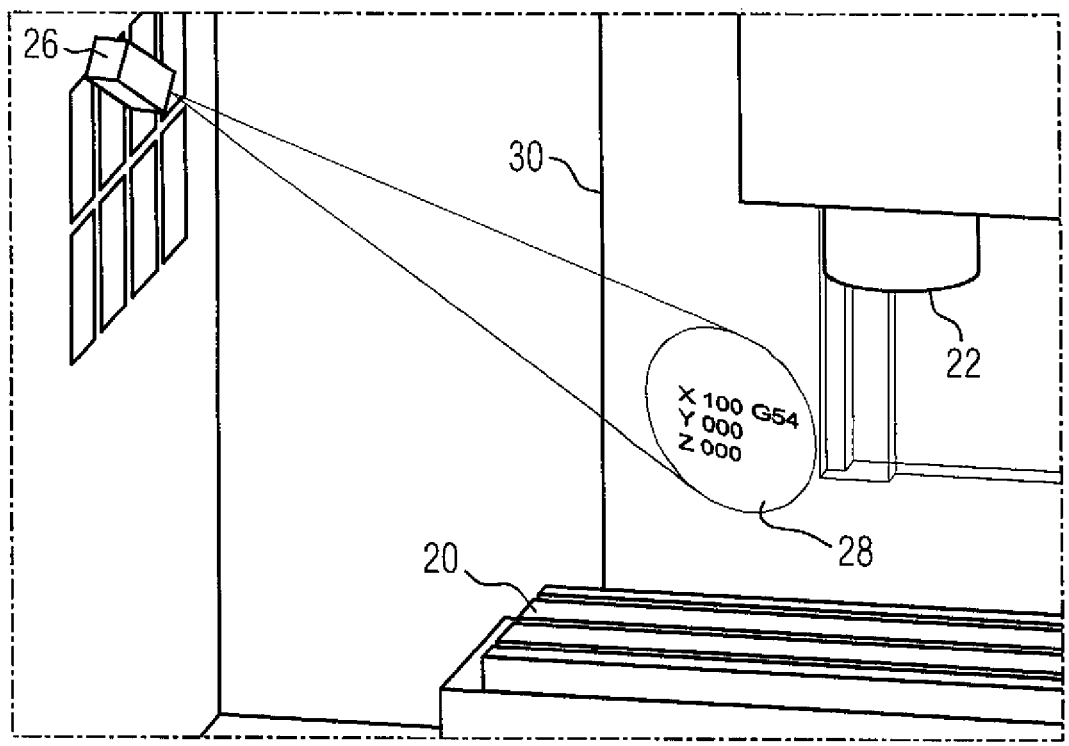

The projection 28 of individual or multiple states of the respective machine tool 10 into its working area, in other words for example as illustrated in FIG. 1 and FIG. 2 into a central region in the vicinity of a milling table 20 that can travel in the x direction and y direction as well as of a milling spindle 22 that can travel in the z direction, allows the operator to observe the or every respective projected state of the machine tool 10 in parallel to for example commissioning, a setup operation or during the machining of a workpiece, so that continuous observation of the machine tool 10 and of the respectively performed movements or actions is possible, without having to divert one's gaze from the machine tool 10 or out of its working area. This significantly facilitates work for the operator and permits fatigue-free working. Furthermore there is a safety gain, because the operator can monitor the machine tool 10 continuously without having to divert his gaze, in order perhaps to be able to monitor a display on an operating panel (OP; not shown), on which such states can likewise in principle be displayed.

FIG. 3 shows a segment of a machine tool 10 that differs from the one in FIG. 1. The difference lies in two further degrees of freedom, namely rotational degrees of freedom. This enables the orientation of the milling table 20 to change, in that it is for example, as shown, oriented to the left. However, rotation of the corresponding axis of rotation also permits a further orientation to the left or corresponding orientations to the right. In addition, a further axis of rotation permits the milling table 20 to be rotated. For this purpose, in the case of the machine tool 10 shown a rotary axis 32 located underneath the milling table 20 is provided, which can itself rotate and thus enables the different orientations of the milling table 20 and further also a rotation of the milling table 20 itself and independently of the rotary axis 32, so that the milling table 20 can be positioned in the illustrated, essentially horizontal orientation, but can also be rotated in any other spatial orientation.

This enables a workpiece 34 shown here attached to the milling table 20 to be accessed from all sides and in different orientations. It will be clear from the explanation of the movement options for the machine tool 10 and the rotational and/or translatory axes/degrees of freedom comprised thereby that it requires considerable spatial imagination to follow the changes occurring with a movement of the milling table 20, in other words also of the workpiece 34 located thereon, of coordinate systems used during operation of the machine tool 10. The invention here provides, to assist an operator of the machine tool 10, that with a projector 24 (FIG. 1) in an embodiment as a 3D projector, in particular a 3D laser projector, a coordinate system used during operation of the machine tool 10 is displayed as a state of the machine tool 10 by means of a projection 28. This is shown in FIG. 3 for a Cartesian coordinate system and it is possible to see the latter's three axes, designated x, y and z as customary.

This projection 28 of a coordinate system is effected at a predefined or predefinable point in space in the working area of the machine tool 10 and such projection 28 allows an operator—as already explained above for the 2D projection—to visually monitor the respective machine tool 10 during commissioning, during setup, during maintenance or during production, in that the or each machine state projected in each case and a movement of the machine tool 10, namely a movement of axes 14, 16 encompassed therein in each case, can be monitored simultaneously.

Additionally or alternatively to the projection 28 of a coordinate system as in FIG. 3 a projection 28 as explained above in connection with FIG. 1 and FIG. 2 can also be effected, in other words a projection 28 of states of the machine tool 10, as given by the positions of the individual axes 14, 16. The type and number of the states of the machine tool 10 projected in each case can be selected by an operator, so that the scope of a projection 28, in other words its information content, can be adapted to requirements.

Figure 4:
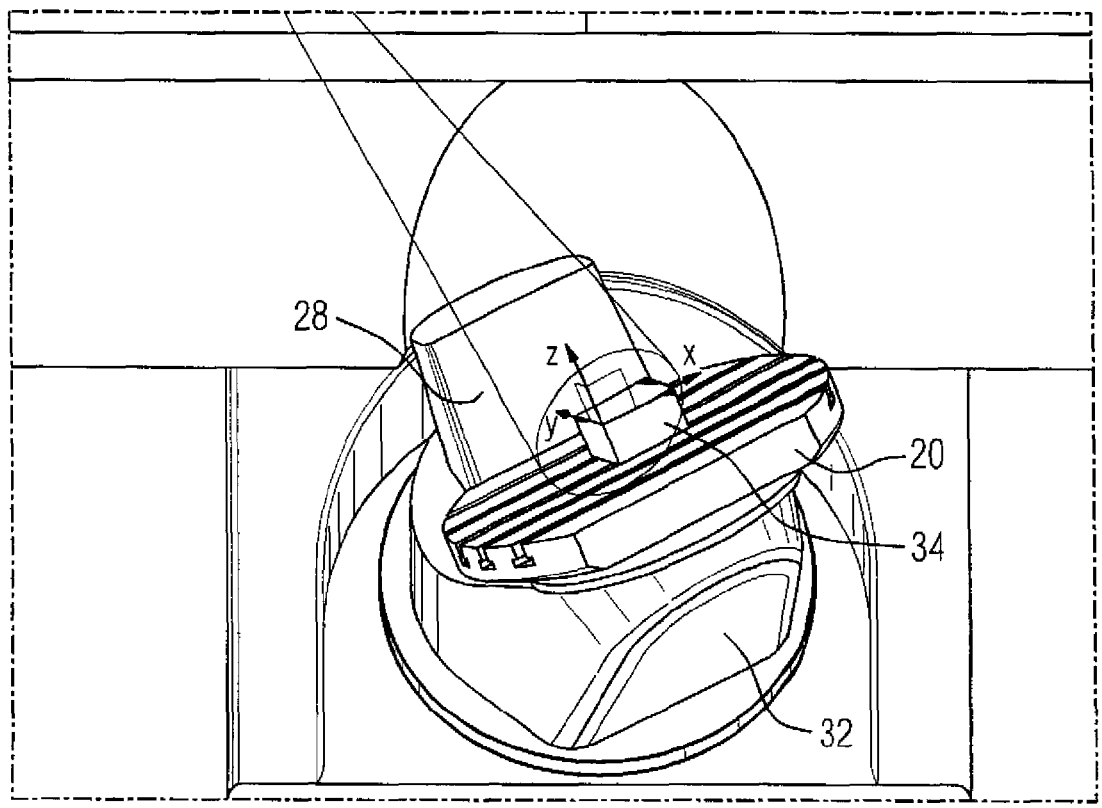

FIG. 4 shows an enlarged segment of the illustration in FIG. 3, so that a renewed explanation of the details already described can be dispensed with here. A special feature of the projection 28 shown in FIG. 4 is that the coordinate system projected as a state of the machine tool 10 into its working area is displayed at a workpiece zero point and thus a connection with a description of a contour/trajectory to be traversed during machining of the workpiece 34 and to be expressed in the workpiece coordinate system (WKS) displayed immediately becomes clear.

Figure 5:
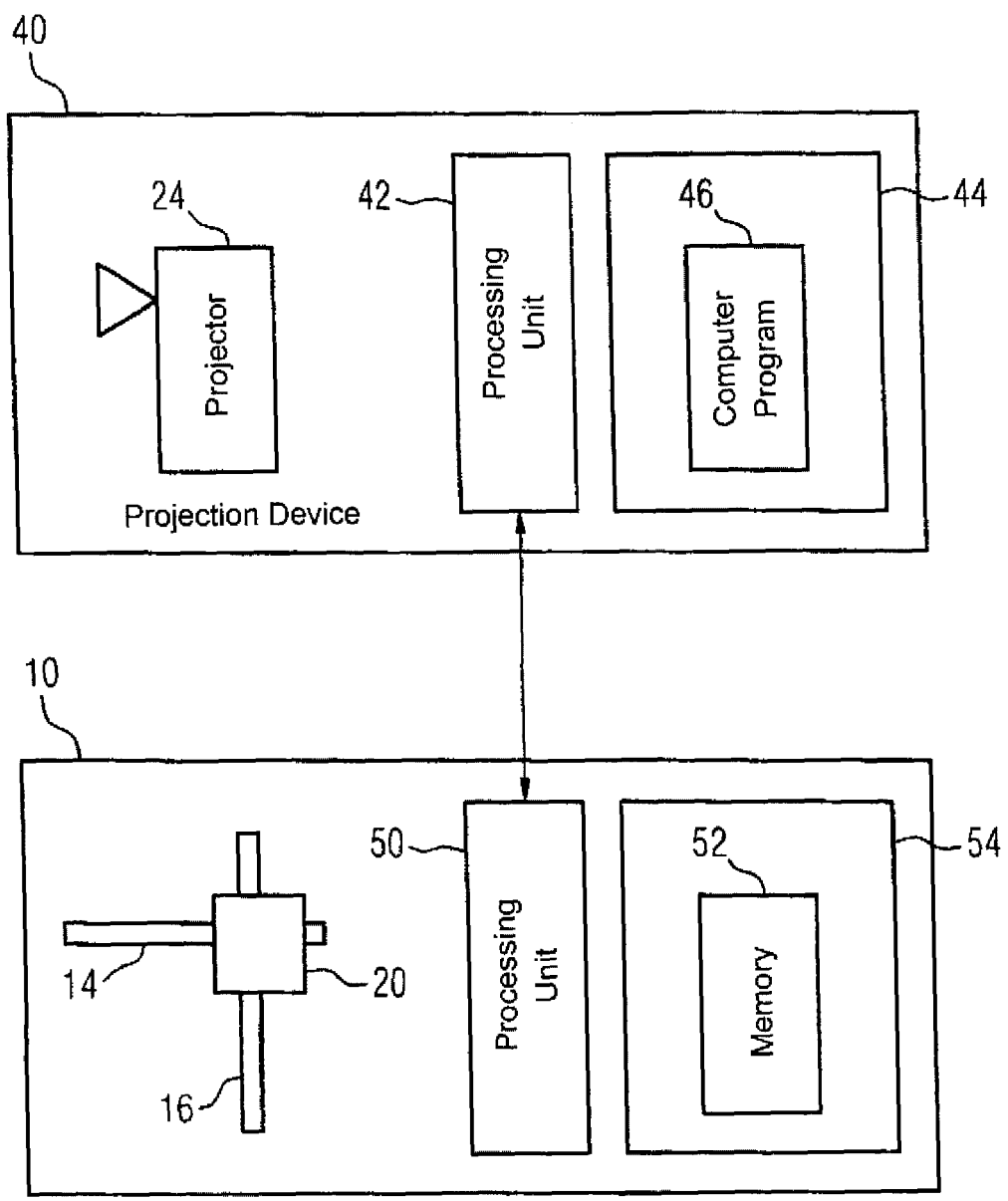

Finally, FIG. 5 shows a diagrammatically simplified outline illustration of a projection device 40 with a projector 24, in other words for example a 2D projector 26 (FIG. 1, FIG. 2) or a 3D projector (FIG. 3, FIG. 4). The projection device 40 includes either such a projector 24 or is connected to such a projector 24 in a suitable manner. The projection device 40 can also simultaneously comprise a 2D projector and a 3D projector or be connected to such projectors. A larger number of such projectors is also possible and expedient and is geared in individual cases to the operating states to be displayed or other information and the spatial circumstances.

To control the projector or each projector 24, the projection device 40 includes a processing unit 42 in the form or of the type of a microprocessor as well as a memory 44. A computer program 46 with which a method for operating a machine tool 10 as described here can be executed is loaded into the memory 44, wherein one or more states of the machine tool 10 are projected into a working area of the machine tool 10 with the projector 24. For this the projection device 40 receives from the machine tool 10, for which in FIG. 4 only two translatory axes 14, 16 are shown simplified, firstly information regarding the respective kinematics of the machine tool 10, in other words information regarding the type and extent of movement of the axes 14, 16 encompassed therein, as well as information regarding a respective current position or orientation of all axes 14, 16 or at least of the main axes.

This information describing states of the machine tool 10 is in any case required during operation of the machine tool 10, if a predefined trajectory is traversed for machining a workpiece 34. For this the machine tool 10 itself includes a processing unit 50 in the form or of the type of a microprocessor as well as a memory 52, into which a machining program, for example a so-called NC program 54 or an RC program, is loaded in the case of a robot acting as a machine tool, which describes the machining of the workpiece 34 by the machine tool 10 envisaged in each case. The exchange of data occurring in this respect between the machine tool 10 and the projection device 40 is illustrated by the double arrow running between the respective processing units 42, 50. The data transfer can be effected in a wired or wireless manner known per se.

The functionality of the projection device 40 can also essentially be assumed by the processing unit 50 of the machine tool 10, in which case the computer program 46 for executing the method for projecting one or more states of the machine tool 10 into its working area is also loaded into its memory 52 in addition to the NC program 54.

Although the invention has been further illustrated and described in detail by the exemplary embodiment, the invention is not restricted by any of the examples disclosed and other variations can be derived therefrom by the person skilled in the art, without departing from the scope of protection of the invention.

Individual highlighted aspects of the description filed here can be summarized briefly as follows:

A method is specified for operating a machine tool 10, wherein during operation of the machine tool 10 one or more states of the machine tool 10 are projected into a working area of the machine tool 10 with a projector 24, as well as a projection device 40 for use with such a method and finally a machine tool 10 with such a projection device 40.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for operating a machine tool, comprising projecting into a working area of the machine tool with a 3D projector at least individual axes of a predefined coordinate system that is used during operation of the machine tool.

2. The method of claim 1, wherein the 3D projector is a 3D laser projector successively emitting laser beams and configured to vary focal points of the emitted laser beam so as to produce an effect visible to the human eye at the predefined point in space.

3. The method of claim 2, wherein the effect visible to the human eye comprises producing a plasma discharge.

4. The method of claim 3, wherein the plasma discharge is produced at predefined points in space along the individual axes of the coordinate system that include a workpiece zero point.

\* \* \* \* \*